Oct. 29, 1957  M. C. HEMSWORTH  2,811,379
SEALING MEANS
Filed Oct. 12, 1955
Fig 1
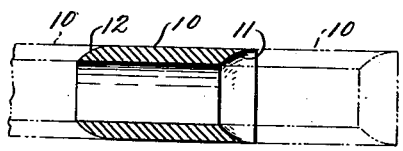
Fig 2
Fig 3
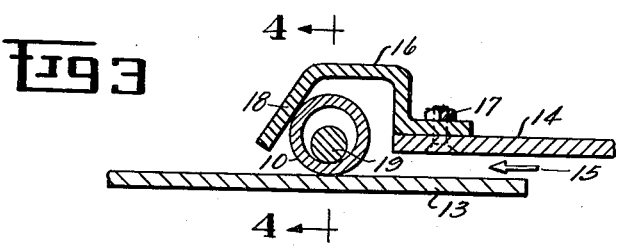
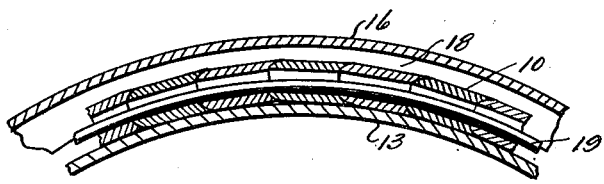
Fig 4
INVENTOR.
MARTIN C. HEMSWORTH
BY
Edward M. Tittle
HIS ATTORNEY

2,811,379

SEALING MEANS

Martin Carl Hemsworth, Cincinnati, Ohio, assignor to General Electric Company, a corporation of New York Application October 12, 1955, Serial No. 540,118

6 Claims. (Cl. 288—4)

The present invention relates to sealing means and, more particularly, to a sealing means that is designed to provide an effective seal for sealing irregular joints or joints that are not accurately machined or do not have fine surface finishes.

In many cases, it is desired to seal joints that, from accuracy standards, may be classed as rough joints. For example, joints between sheet metal parts may present irregular or rough surfaces that, depending upon the use of the joint, must be effectively sealed. The joints in question may extend all the way from linear to circular joints. In the latter type joints, it is common to use a standard O-ring to provide an effective seal. In such a seal, the O-ring is designed to be deformed and formed into a V-formation to effectively seal the portion defined by the V. This type of a seal is well known and is described merely as background information to define the field of use of the present invention.

The main object of the present invention is to disclose a sealing means that is adaptable to the general uses to which an O-ring type seal may be put and to additional uses where the O-ring seal may not suffice.

A further object of the present invention is to disclose a sealing means that may be employed on all types of joints ranging from linear to circular.

Another object is to provide a seal that is especially adaptable to sealing joints that may present irregular or rough surfaces.

Briefly stated, in accordance with one aspect of my invention, I provide a series of axially arranged hollow, deformable, elements that are designed to nest one within the other, and are tied together by a wire or its equivalent to maintain the nesting relation. The plurality of nesting members permits the sealing means to accommodate itself to irregular or rough surfaces.

My invention will be better understood from the following description taken in connection with the accompanying drawing and its scope will be pointed out in the appended claims.

In the drawing:

Figure 1 is a perspective view of a typical flexible member used in the sealing means;

Figure 2 is a cross-sectional view of a single flexible member showing the nesting relation with adjacent members in phantom;

Figure 3 is a cross-sectional view of the sealing means as applied to a typical joint and;

Figure 4 is a partial cross-sectional view taken on the line 4—4 of Figure 3.

Referring first to Figure 1, there is shown a cylindrical sealing element 10 typical of the type employed in the present invention. Each member 10 may be made of any suitable preferably deformable material whether it be metallic or non-metallic or intended for low or high temperature uses. Member 10 has a socket formation 11 on one end and a socket-engaging portion 12 on the other end. As shown in Figure 2, portions 11 and 12 provide a ball and socket type connection with the adjacent similar members 10, shown in phantom. Thus, flexibility is provided for the members 10 to axially align themselves angularly with respect to one another and still provide an effective seal by reason of their nesting relation to one another.

It will be appreciated that member 10 need not be cylindrical as shown but may assume any desired cross-sectional shape. In addition, socket portion 11 may comprise any irregular shape so long as a corresponding reverse shape is provided on the opposite end of member 10. The form shown in Figures 1 and 2 is merely a preferred execution of the sealing members. Any shapes that will provide the overlapping nesting engagement shown in Figure 2 will suffice to seal an irregular surface and are intended to be suggested by the preferred embodiment shown. The degree of flexibility required of member 10 may vary depending upon the irregularity of the joint to be sealed and the conditions of temperatures and pressures that may be encountered. Suitable material for members 10 is selected in accordance with these conditions.

Figure 3 shows a typical joint that may be sealed with the sealing means of the present invention. It may comprise an inner member 13 and an outer member 14 that may be spaced relative to each other to provide an open passage 15 that is the source of pressure fluid attempting to escape the confines of members 13 and 14 by following the path of the arrow. A seal retaining member 16 may be secured to member 14 by any suitable means such as bolts 17. It can be seen that, upon the application of pressure, as shown by the arrow, member 10 will deform and be forced against member 13 and wall 18 to form a tight seal therebetween and prevent the escape of the pressure fluid.

Since the sealing means of the present invention is composed of a series of axially aligned members 10 arranged in overlapping nesting relation, as shown in Figure 2, it is necessary to use some means to maintain this nesting relation to provide an effective seal. Such a means may comprise a wire-like element 19 that is passed through each member 10 and may or may not be secured to itself to form a closed loop as is partially shown in Figure 4. Element 19, may as shown, occupy substantially less than the cross-sectional area of members 10. The use of this element 19 insures the snug nesting of the individual members 10 with its adjacent members. It can be seen that element 19 need not be closed upon itself but may comprise a string-like formation of members 10 where a flat or linear or curved type joint is employed as the partial view of Figure 4 may represent.

From the description, it will be apparent that the instant sealing means is adaptable to provide effective sealing for any regular or irregular type joint. The flexibility of the string-like formation of members 10 permits the sealing means to adapt itself also to surfaces that are not accurately machined or that do not have fine surface finishes.

In operation, as seen in Figure 3, the sealing means comprising a series of members 10 tied together by element 19, may be slid axially over member 13 to the desired position. Member 14 is then pushed into its telescopic relation as shown, after which retaining member 16 may be secured in position. Upon application of pressure through passage 15, the sealing means will effectively seal the opening between member 13 and wall 18 and accommodate itself to any irregularities in these two elements whether it be surface irregularities or an irregular periphery.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent is:

1. Means for sealing a joint between irregular surfaces comprising, a plurality of deformable members arranged in seriatim for peripheral sealing abutment of each member with each of said surfaces, each member formed to nest in annular and substantial longitudinal overlapping engagement with an adjacent member, and means maintaining all of said members in said engagement.

2. Means for sealing a joint between irregular surfaces comprising, a plurality of deformable members arranged in seriatim for peripheral sealing abutment of each member with each of said surfaces, each member having an annular irregular surface on one end and a like reverse surface on the other end, the irregular surface of each member being in annular and substantial longitudinal nesting overlapping engagement with the reverse surface of the adjacent member, and means maintaining all of said members in said engagement.

3. Means for sealing a joint between irregular surfaces comprising, a plurality of deformable tubular members arranged in seriatim for peripheral sealing abutment of each member with each of said surfaces, each member having an irregular surface on one end and a like reverse surface on the other end, the irregular surface of each member being in nesting overlapping engagement with the reverse surface of the adjacent member, and means extending through all of said tubular members to maintain said members in engagement.

4. Means for sealing a joint between irregular surfaces comprising, a plurality of deformable hollow annular members arranged in seriatim, each member having a socket-like formation on one end and a ball-like formation on the other end, the ball-like formation of each member being in nesting overlapping engagement with the socket-like formation of the adjacent member, and means occupying substantially less than the hollow cross-sectional area extending through all of said annular members to maintain said members in overlapping engagement.

5. Means for sealing a joint between irregular surfaces comprising, a plurality of deformable hollow circular members arranged in seriatim for peripheral sealing abutment of each member with each of said surfaces, each member having a socket portion on one end and a corresponding socket-engaging portion on the other end, the members being in nesting engagement with each other, and wire-like means, occupying substantially less than the hollow cross-sectional area, extending through all of said circular members to maintain said members in nesting engagement.

6. Means for sealing a joint between irregular surfaces comprising, a plurality of deformable cylindrical members arranged in seriatim for peripheral sealing abutment of each member with each of said surfaces, each member having a hollow socket portion on one end and a corresponding hollow socket-engaging portion on the other end, the members being in axial nesting engagement with each other, and wire-like means extending through all of said cylindrical members and secured to itself to form a closed loop of said nesting cylindrical members.

References Cited in the file of this patent
UNITED STATES PATENTS

| 522,459 | Ellis | July 3, 1894 |
| 1,798,268 | Mellor | Mar. 31, 1931 |